(12) United States Patent
Benoit et al.

(10) Patent No.: US 9,220,372 B2
(45) Date of Patent: Dec. 29, 2015

(54) GLASS BOWL ASSEMBLY FOR BOWL LIFT MIXER

(71) Applicant: Whirlpool Corporation, Benton Harbor, MI (US)

(72) Inventors: Kaitlyn Benoit, Saint Joseph, MI (US); Thomas A. Gillette, Stevensille, MI (US); Mitchell L. Robertson, Elkhart, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 361 days.

(21) Appl. No.: 13/783,191

(22) Filed: Mar. 1, 2013

(65) Prior Publication Data

US 2014/0246442 A1  Sep. 4, 2014

(51) Int. Cl.
*A47J 43/27* (2006.01)
*B01F 15/00* (2006.01)
*A47J 43/07* (2006.01)

(52) U.S. Cl.
CPC ........ *A47J 43/0727* (2013.01); *B01F 15/00857* (2013.01)

(58) Field of Classification Search
CPC ............... B65D 2525/289; B65D 2543/00564; A47J 43/0727; B01F 15/00857
USPC .......................................................... 220/758
See application file for complete search history.

(56) References Cited

U.S. PATENT DOCUMENTS

| 1,681,197 | A | * | 8/1928 | Rueff ......................... 220/710.5 |
| 2,275,875 | A | * | 3/1942 | Werfel ......................... 294/31.2 |
| 2,655,824 | A | * | 10/1953 | Land et al. ..................... 81/3.43 |
| 2,658,642 | A |   | 11/1953 | Casella |
| 2,677,947 | A | * | 5/1954 | Van Guilder ............... 220/710.5 |
| 2,790,669 | A | * | 4/1957 | Crawford ..................... 294/31.2 |
| 2,791,405 | A |   | 5/1957 | Liston |
| 3,101,857 | A | * | 8/1963 | Freedman ..................... 215/396 |
| 3,292,912 | A |   | 12/1966 | Stubler |
| 3,311,399 | A | * | 3/1967 | Holton ......................... 294/31.2 |
| 4,042,221 | A |   | 8/1977 | Myers et al. |
| 4,396,128 | A | * | 8/1983 | Larson et al. ................. 215/399 |
| 4,683,155 | A | * | 7/1987 | Majthan ....................... 220/752 |
| 5,232,188 | A |   | 8/1993 | Troncone |
| 5,299,768 | A | * | 4/1994 | Berry ......................... 248/145.6 |
| 5,752,618 | A | * | 5/1998 | Trebitz et al. ................. 220/642 |
| 5,906,432 | A |   | 5/1999 | Wade et al. |
| 6,494,610 | B1 | * | 12/2002 | Brunswick .................... 366/207 |
| 6,562,301 | B1 |   | 5/2003 | Dean et al. |
| 6,673,319 | B2 |   | 1/2004 | Dean et al. |
| 7,018,090 | B2 |   | 3/2006 | Moore |
| 7,384,187 | B2 |   | 6/2008 | Blackburn et al. |
| 7,581,770 | B2 | * | 9/2009 | Jones .......................... 294/31.2 |
| 8,251,567 | B2 |   | 8/2012 | Brunswick et al. |

(Continued)

*Primary Examiner* — Tony G Soohoo (57) ABSTRACT

A bowl assembly for a stand mixer includes an at least partially translucent container that includes a sidewall and a bottom wall. The container includes an inner surface, an outer surface, and an open upper edge. A channel is disposed on the outer surface substantially parallel with the open upper edge. The channel includes upper and lower circumferential walls and a channel wall that extends between the upper and lower circumferential walls. A gasket includes top and bottom sealing flanges and is configured for reception in the channel. A band assembly includes at least one elongate band and a tensioning mechanism. The band assembly is configured for reception in the channel. First and second support members extend substantially orthogonally from the at least one elongate band.

18 Claims, 11 Drawing Sheets

(56) References Cited

U.S. PATENT DOCUMENTS

| | | | |
|---|---|---|---|
| D668,915 S * | 10/2012 | Drees | D7/586 |
| D701,420 S * | 3/2014 | Benoit et al. | D7/379 |
| D702,487 S * | 4/2014 | Gillette et al. | D7/379 |
| 2002/0093877 A1 * | 7/2002 | Brunswick et al. | 366/206 |
| 2003/0052139 A1 * | 3/2003 | Boyte et al. | 222/475.1 |
| 2005/0002272 A1 * | 1/2005 | Brunswick et al. | 366/207 |
| 2010/0208548 A1 * | 8/2010 | Hemelgarn et al. | 366/198 |

* cited by examiner

GLASS BOWL ASSEMBLY FOR BOWL LIFT MIXER

BACKGROUND

The present application generally relates to mixing bowls, and more specifically, to a mixing bowl with a removable support band assembly.

SUMMARY

In one aspect, a bowl assembly for a stand mixer includes an at least partially translucent container that includes a sidewall and a bottom wall. The container includes an inner surface, an outer surface, and an open upper edge. A channel is disposed on the outer surface substantially parallel with the open upper edge. The channel includes upper and lower circumferential walls and a channel wall that extends between the upper and lower circumferential walls. A gasket includes top and bottom sealing flanges and is configured for reception in the channel. A band assembly includes at least one elongate band and a tensioning mechanism. The band assembly is configured for reception in the channel. First and second support members extend substantially orthogonally from the at least one elongate band.

In another aspect, a bowl assembly for a stand mixer includes a substantially clear container having a sidewall and a bottom wall. The container includes an inner surface, an outer surface, and an open upper edge. A channel is disposed on the outer surface substantially parallel with the open upper edge. The channel includes upper and lower circumferential walls and a channel wall that extends between the upper and lower circumferential walls. At least one engagement protuberance is disposed in and integral with the channel. A band assembly includes at least one elongate band and a tensioning mechanism. The band assembly is configured for reception in the channel. First and second support members extend substantially orthogonally from the at least one elongate band.

In yet another aspect, a bowl assembly for a stand mixer includes a substantially clear container. A channel is disposed on an outer surface of the container substantially parallel with an open upper edge. At least one engagement protuberance is disposed in and integral with the channel. A band assembly includes at least one elongate band and a tensioning mechanism. The band assembly is configured for reception in the channel. A plurality of engagement protuberances are spaced about the channel and integrally formed with the container. A plurality of keyed notches are disposed in the band assembly. The plurality of keyed notches are configured to receive the engagement protuberances. First and second support members extend substantially orthogonally from the at least one elongate band.

These and other features, advantages, and objects will be further understood and appreciated by those skilled in the art upon studying the following specification, claims, and appended drawings.

DETAILED DESCRIPTION OF EMBODIMENTS

Figure 1:
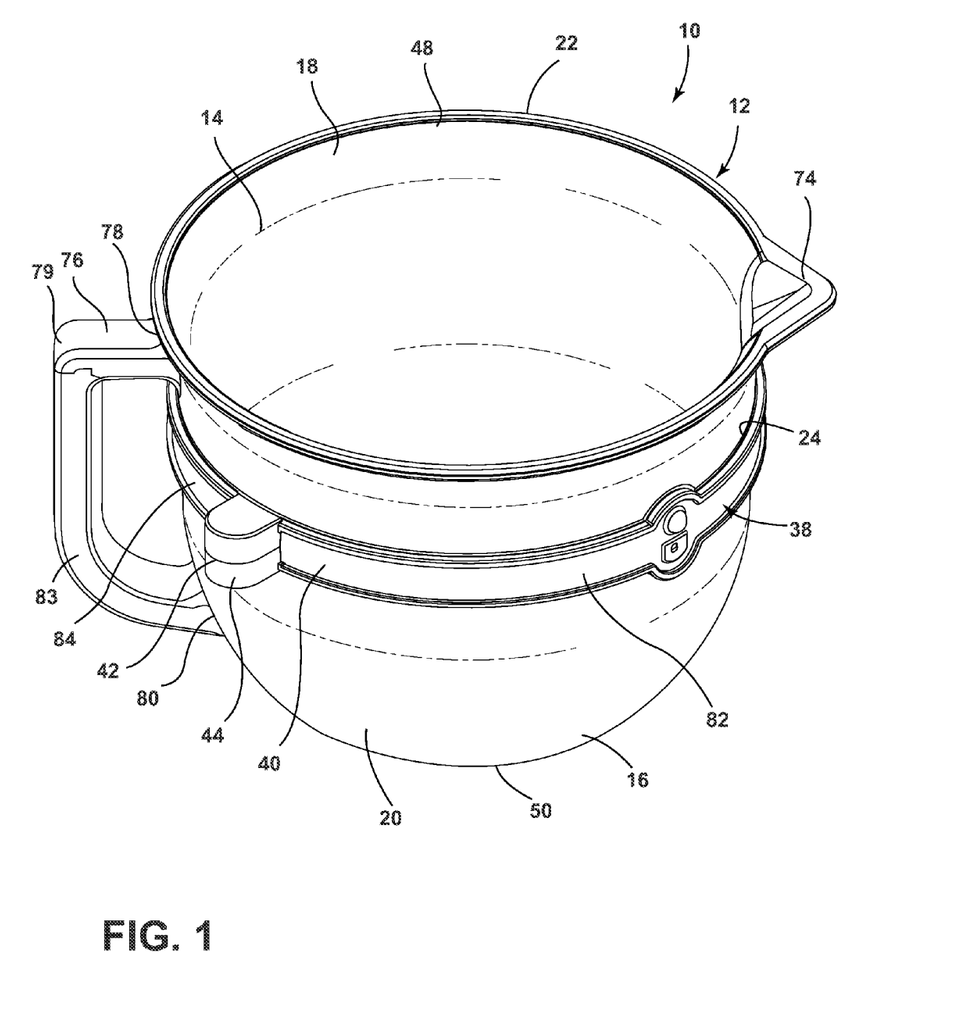
FIG. 1 is a top perspective view of one embodiment of the glass bowl assembly.
Figure 2:
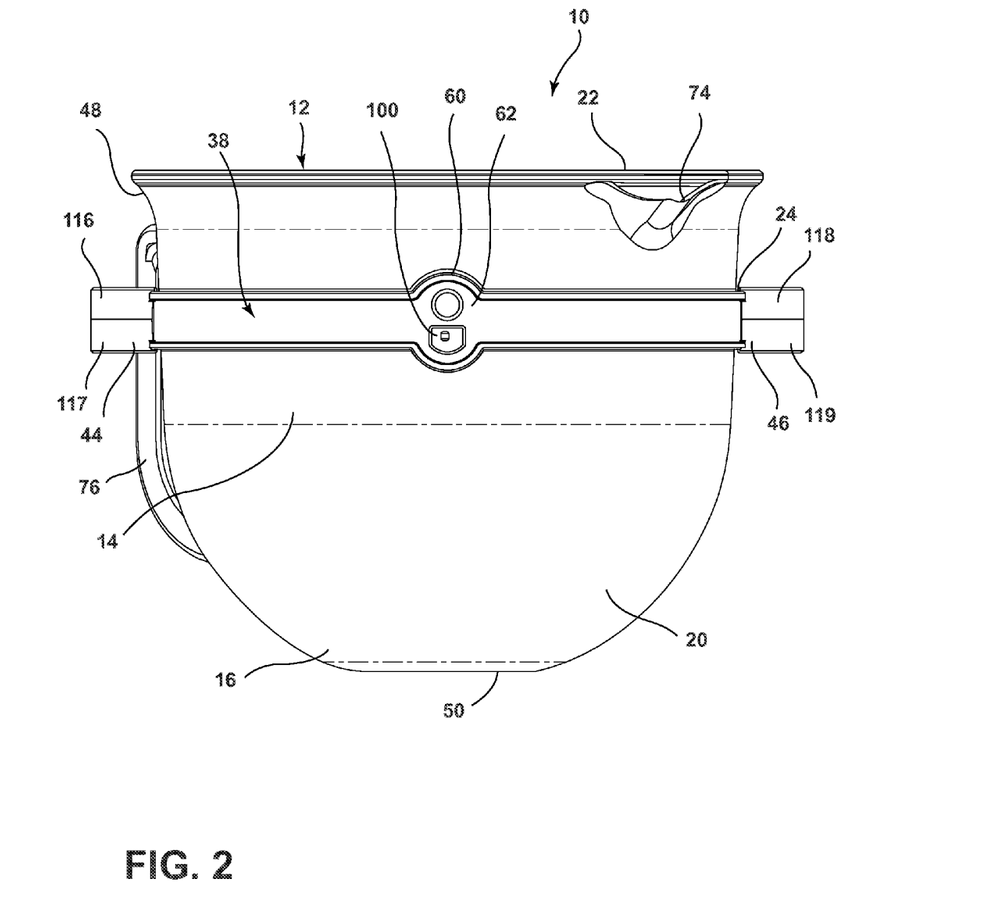
FIG. 2 is a first side elevational view of the embodiment of FIG. 1.
Figure 3:
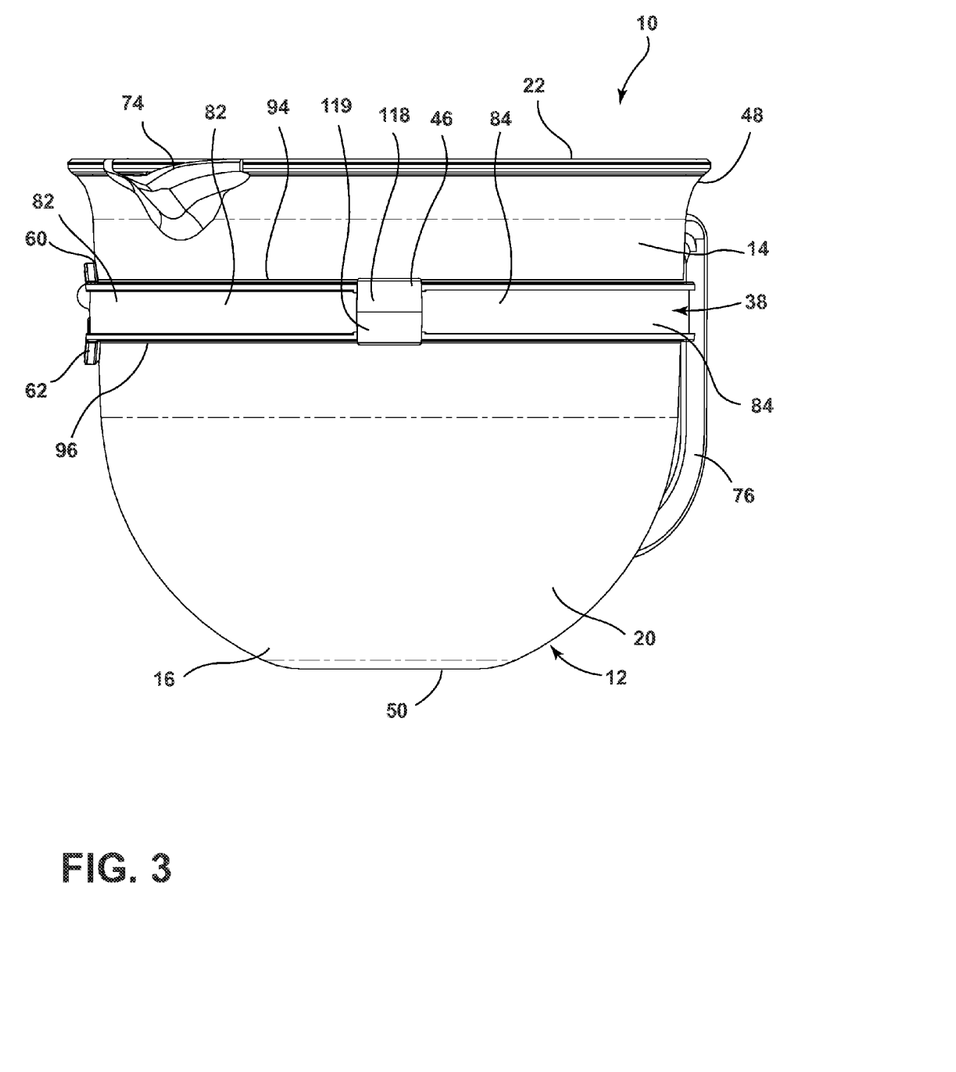
FIG. 3 is a second side elevational view of the embodiment of FIG. 1.
Figure 4:
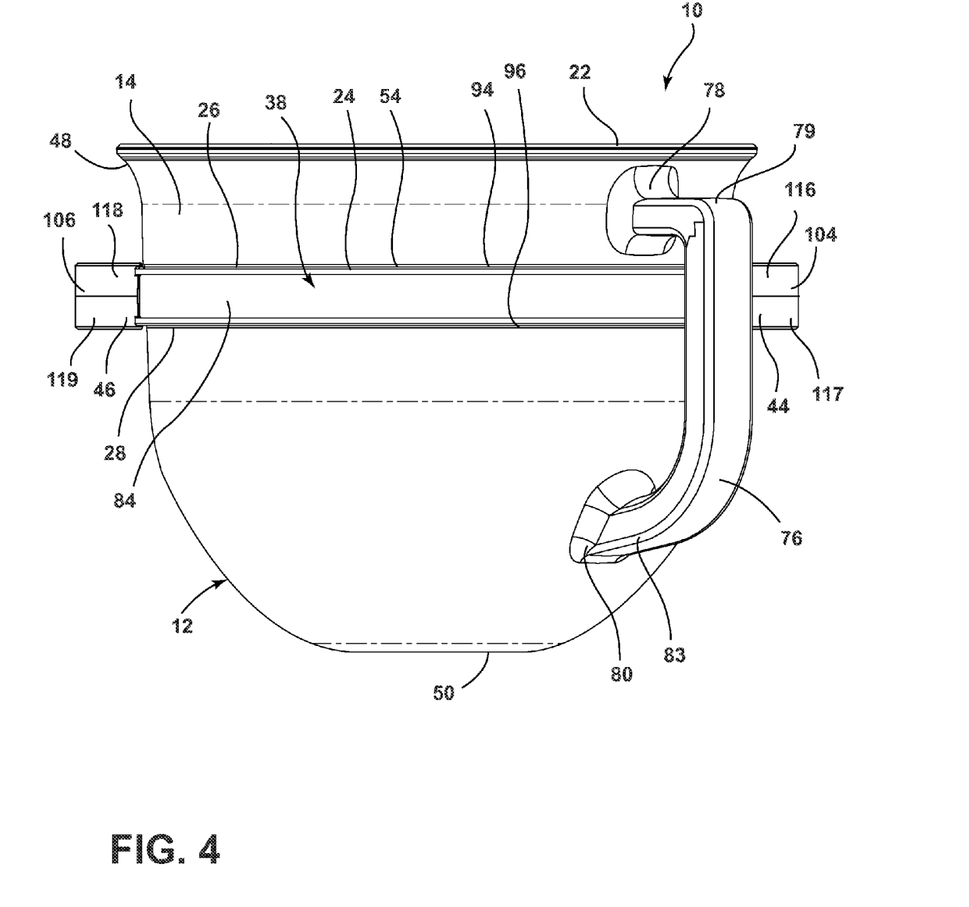
FIG. 4 is a third side elevational view of the embodiment of FIG. 1.
Figure 5:
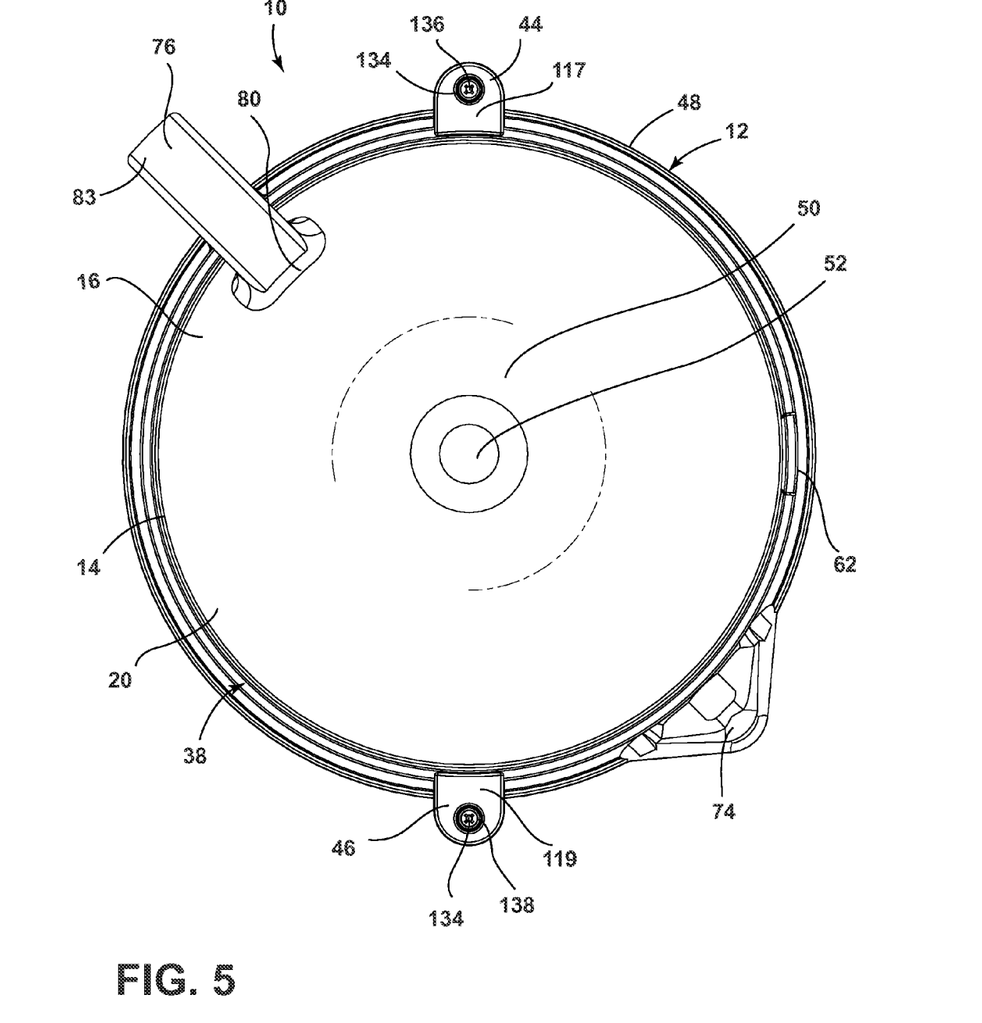
FIG. 5 is a bottom plan view of the embodiment of the FIG. 1.
Figure 6:
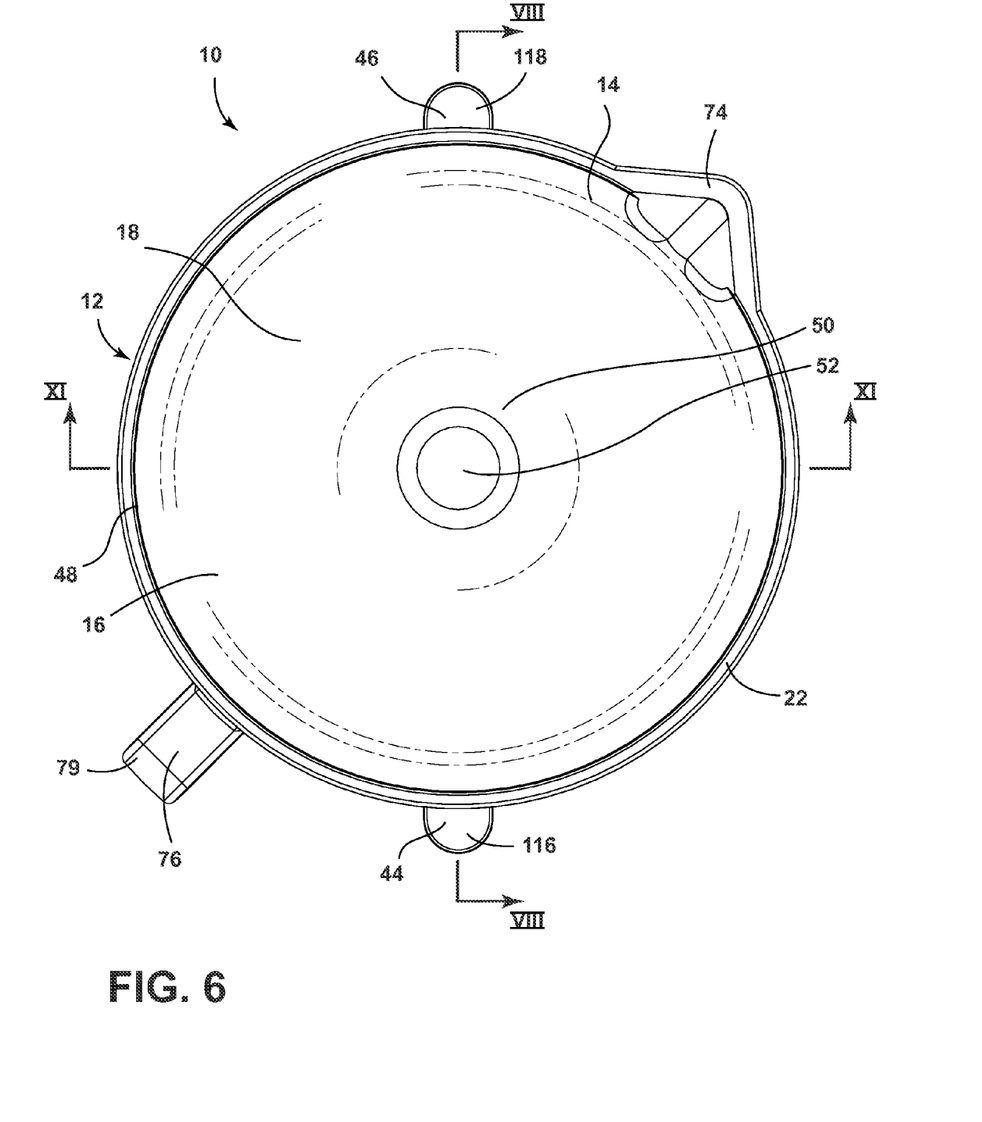
FIG. 6 is a top plan view of the embodiment of FIG. 1.

For purposes of description herein the terms "upper," "lower," "right," "left," "rear," "front," "vertical," "horizontal," and derivatives thereof shall relate to the application as oriented in FIGS. 1 and 2. However, it is to be understood that the application may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, reference identifier 10 generally refers to a bowl assembly for a stand mixer having an at least partially translucent container 12 that includes a sidewall 14 and a bottom wall 16. The container 12 includes an inner surface 18, an outer surface 20, and an open upper edge 22. A channel 24 is disposed on the outer surface 20 substantially parallel with the open upper edge 22. The channel 24 includes upper and lower circumferential walls 26, 28 and a channel wall 30 that extends between the upper and lower circumferential walls 26, 28 (shown in FIGS. 7-13). A gasket 32 includes top and bottom sealing flanges 34, 36 and is configured for reception in the channel 24 (shown in FIGS. 9-10 and 12-13). A band assembly 38 includes at least one elongate band 40 and a tensioning mechanism 42. The band assembly 38 is configured for reception in the channel 24. First and second support members 44, 46 extend substantially orthogonally from the at least one elongate band 40.

As illustrated in FIGS. 2-7, the container 12 has a substantially hemispheric bottom wall 16 and a cylindrical sidewall 14 that extends from the hemispheric bottom wall 16. The container 12 also includes a flared lip 48 extending from the open upper edge 22 and away from the inner surface 18. The hemispheric bottom wall 16 also includes a substantially flat base 50 to allow the container 12 to sit upright.

Figure 7:
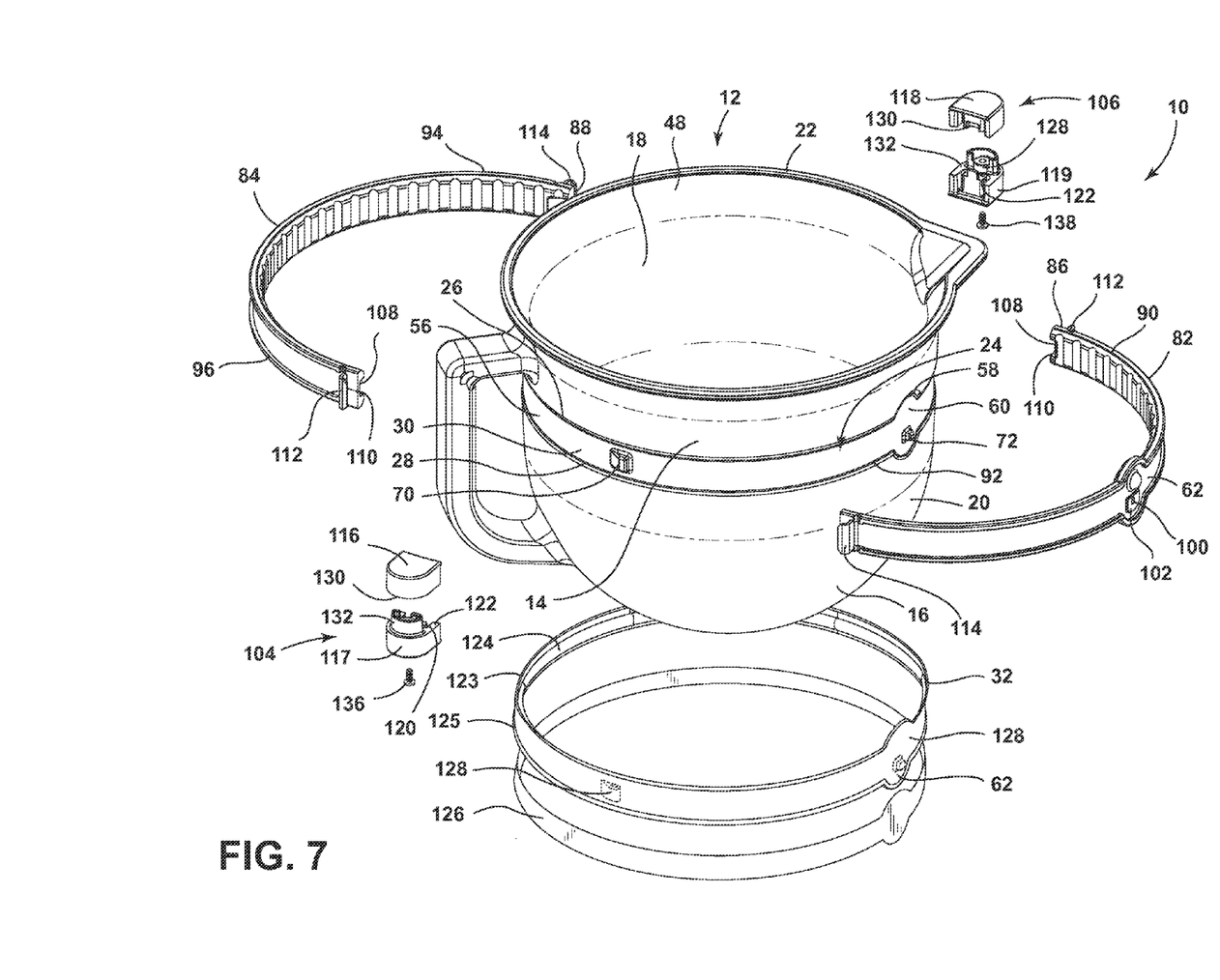
FIG. 7 is an exploded top perspective view of the embodiment of FIG. 1.

As shown in FIG. 7, the outer surface 20 of the container 12 contains a channel 24 around a circumference of the cylindrical sidewall 14 for receiving the band assembly 38. The channel 24 includes a recessed portion 56 in the outer surface 20 of the sidewall 14, where the recessed portion 56 defines the upper and lower circumferential walls 26, 28 of the channel wall 30.

As further shown in FIG. 7, in one embodiment, the top and bottom circumferential walls 26, 28 of the channel 24 includes arcuate cutout 58 that defines an orientation wall 60 of the channel 24. The orientation wall 60 is configured to receive an orienting portion 62 of the band assembly 38 that is cooperatively shaped with the orienting wall 60 to insure that the band assembly 38 is disposed in the channel 24 in a specific predetermined orientation.

As best illustrated in FIGS. 7-11, several engagement proturbances extend from the surface of the channel wall 30. Each of the engagement proturbances includes an engagement surface 66 that extends to an engagement edge 68 at the apex of the engagement proturbances. The engagement surfaces 66 and engagement edges 68 of the engagement proturbances are configured to receive specific portions of the band assembly 38 to prevent lateral slippage of the band assembly 38 within the channel 24. In addition, at least one engagement proturbance includes an orienting proturbance 72 disposed within the orienting wall 60 of the channel 24 to engage the orienting portion 62 and to further orient the band assembly 38 in a specific predetermined location within the channel 24.

Figure 9:
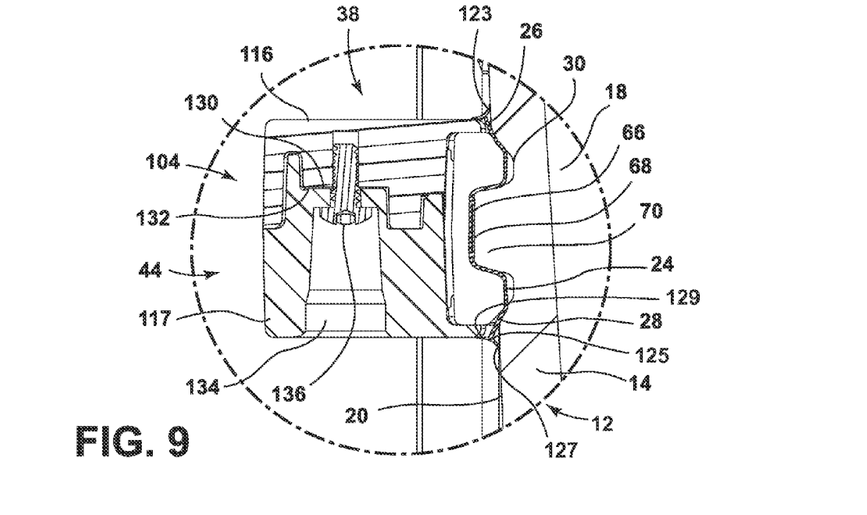
FIG. 9 is an enlarged detail view of the embodiment of FIG. 1 taken at area IX.

As shown in FIGS. 7 and 9, the engagement proturbances also include a plurality of support protuberances 70 that extend from the channel wall 30 and are configured to receive the band assembly 38 where the first and second support members 44, 46 engage the band assembly 38. In this manner, the support protuberances 70 can orient the first and second support members 44, 46 in a specific location about the outer surface 20 of the container 12, and also prevent lateral movement of the first and second support members 44, 46 about the container 12.

Figure 8:
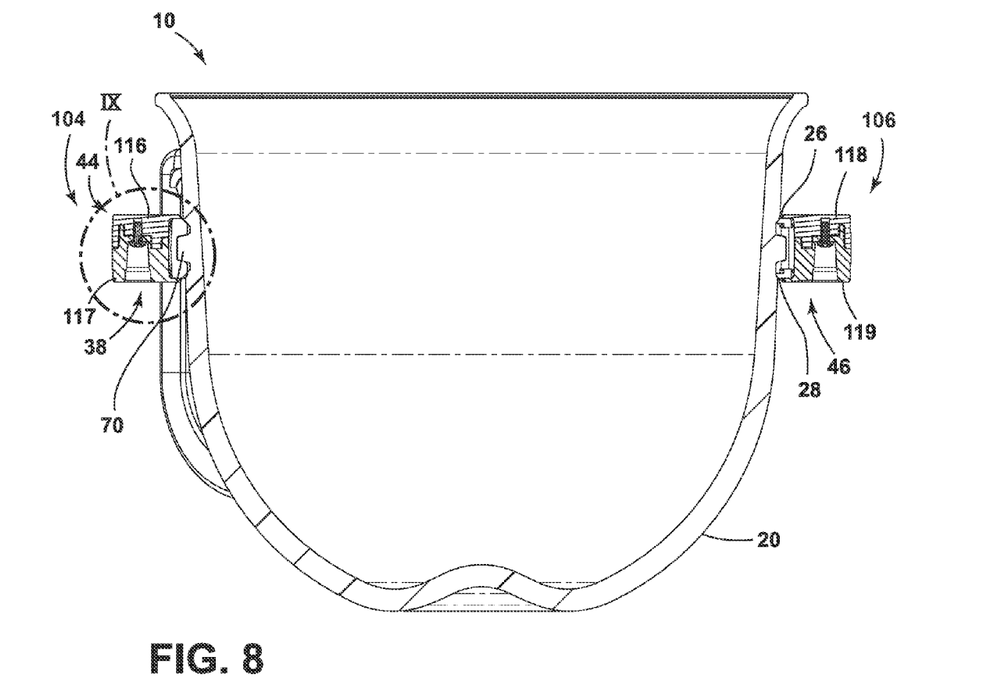
FIG. 8 is a first cross-sectional view of the embodiment of FIG. 1 taken at line VIII-VIII.

As illustrated in FIGS. 7 and 8, the support protuberances 70 are disposed within the channel 24, approximately 180° apart on the outer surface 20 of the container 12. While not preferred, the support protuberances 70 may be spaced apart less than 180°. The support and orienting protuberances 70, 72 are integrally formed with the container 12. In less preferred embodiments, the support and orienting protuberances 70, 72 may be separate members that are coupled to the container 12, in the predetermined locations discussed above, by mechanical fasteners or adhesive fasteners.

Referring again to the illustrated embodiments, as shown in FIGS. 1-7, the container 12 can be made of glass or other ceramic material. The container 12 can range from being partially translucent to being substantially transparent. The material selected for the container 12 should also be of a substantially sturdy material that can substantially withstand mixing functions selectively performed within the container 12. While less preferred, the container 12 can also be made of acrylic or other materials that are at least partially translucent.

Referring back to FIGS. 1-6, the container 12 can include a pour spout 74 disposed within the flared lip 48 of the container 12. In addition, the container 12 may include a handle 76 coupled with the outer surface 20 of the container 12 at first and second handle ends 78, 80. The handle 76 extends substantially orthogonally from the outer surface 20 of the container 12 from the first handle end 78 to a first angle portion 79. The handle 76 further extends substantially downward from the first angle portion 79 to an arcuate handle transition 83 extending toward the second handle end 80 coupled to the outer surface 20 of the container 12.

In alternate embodiments, the handle 76 may be coupled to the outer surface 20 of the container 12 at the first handle end 78 and extend upward or downward to the second handle end 80 that is distal from the outer surface 20 of the container 12, thereby defining an open ended handle 76. This alternate configuration can assist in selectively removing and reattaching the band assembly 38 from the outer surface 20 of the container 12 by allowing the band assembly 38 to be removed through the open end of the handle 76. The pour spout 74 and handle 76 are integrally formed with the container 12. In alternate embodiments, the handle 76 and pour spout 74 may be separate fixtures coupled with the container by mechanical or adhesive fasteners.

In other alternate embodiments, the channel 24 may be defined by top and bottom circumferential protrusions that extend from the outer surface 20 of the sidewall 14, where the channel wall 30 extends between the top and bottom circumferential protrusions. In yet other alternate embodiments, the channel wall may extend from an upper circumferential wall 26 of the channel 24, where the channel wall 30 extends downward and tapers to merge into the outer surface 20 of the container 12. In such an embodiment, the channel 24 does not include a lower circumferential wall 28.

Referring again to the illustrated embodiment, as best illustrated in FIGS. 3 and 7-13, the mixing bowl 10 also includes a band assembly 38 that is configured to be disposed in the channel 24 of the outer surface 20 of the container 12. The band assembly 38 can include first and second elongate members 82, 84, each with first and second ends 86, 88 where the first end 86 of the first elongate member 82 couples to the second end 88 of the second elongate member 84 and vice versa to attach the band assembly 38 to the outer surface 20 of the container 12, within the channel 24. The first and second elongate members 82, 84 have a thickness that can be substantially similar to a depth of the channel 24. Each of the first and second elongate members 82, 84 has top and bottom edges 94, 96. The top edge 94 of each elongate member 82, 84 is configured to engage the upper circumferential wall 26 of the channel 24. The bottom edge 96 of each elongate member 82, 84 is configured to engage the lower circumferential wall 28 of the channel 24.

Figure 11:
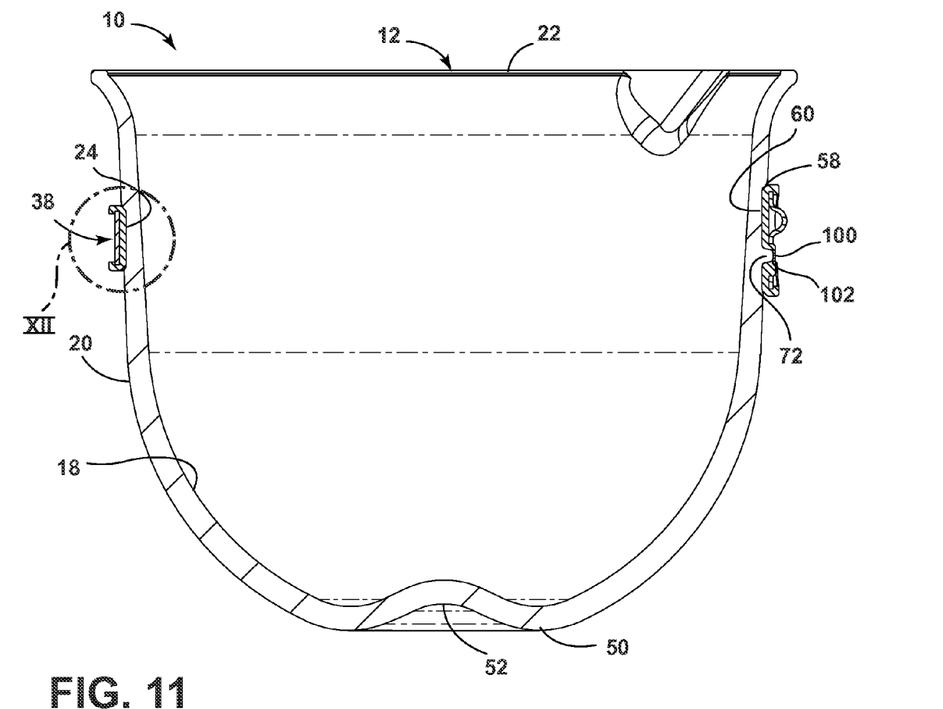
FIG. 11 is a second cross-sectional view of the embodiment of FIG. 1 taken at line XI-XI.
Figure 12:
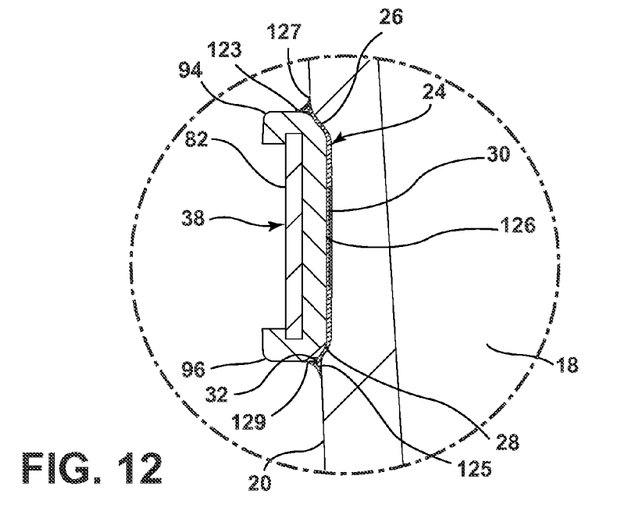
FIG. 12 is a second detail section view of the embodiment of FIG. 1 taken at area XII.

As illustrated in FIGS. 7 and 11, the first elongate member 82 can include the orienting portion 62 that is configured to be received by the orientation wall 60 of the channel 24. The orienting portion 62 also includes an orientation notch 100 for receiving the orienting proturbance 72. An orientation slot 102 can also be disposed in the orienting portion 62 and configured to be in communication with the orientation notch 100. The orientation slot 102 can also be configured to slidably receive the orientation proturbance 72 to secure the first and second elongate members 82, 84 and the band assembly 38 to the outer surface 20 of the container 12.

It should be understood that the orienting portion 62 can also be disposed on the second elongated member 84. In addition, the orienting portion 62 and the band assembly orienting position can have a different shape, such as, but not limited to orthogonal, irregular, or other arcuate shapes.

Referring again to the illustrated embodiments, as illustrated in FIGS. 7-10, the first and second ends 86, 88 of the first and second elongate members 82, 84 are configured to couple at first and second tension interfaces 104, 106 and are disposed proximate the area where the first and second support members 44, 46 couple with the first and second elongated members 82, 84. The first tension interface 104 can include the first end 86 of the first elongate member 82 and the second end 88 of the second elongate member 84. The second tension interface 106 can include the second end 88 of the first elongate member 82 and the first end 86 of the second elongate member 84.

Figure 10:
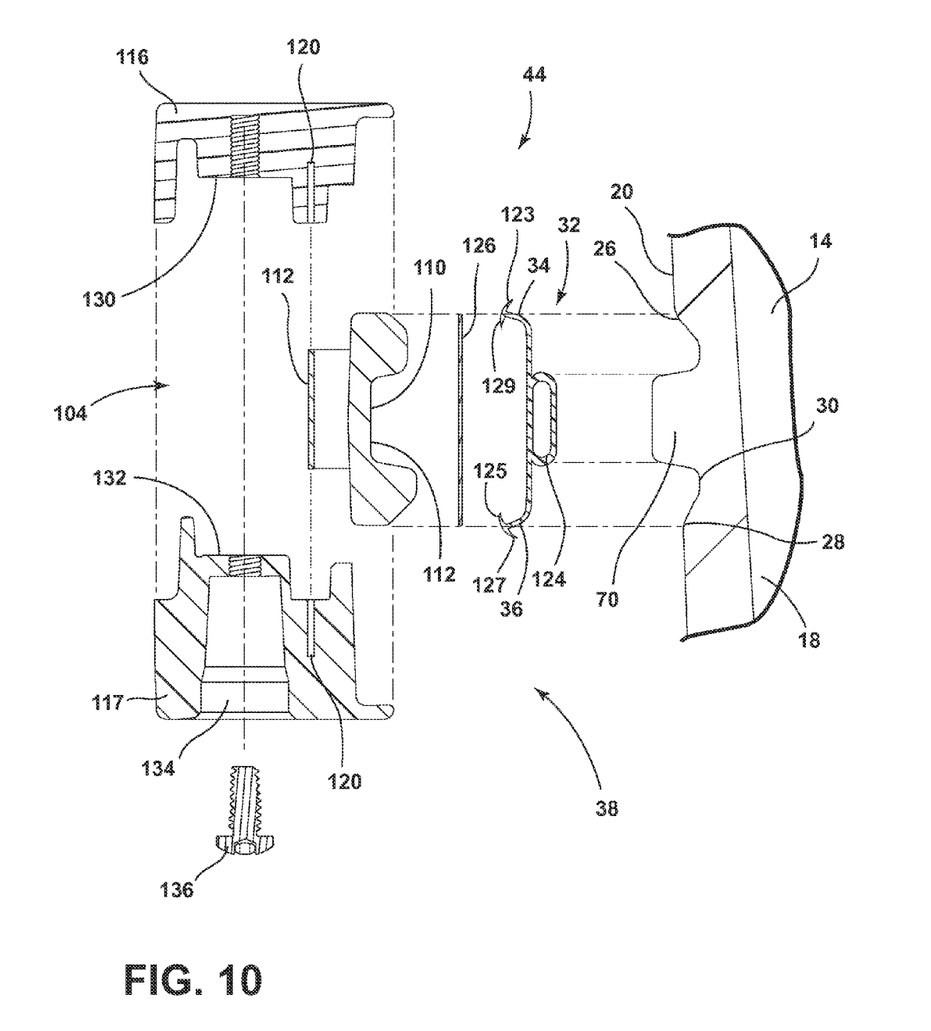
FIG. 10 is an exploded detail section view of FIG. 9.

As illustrated in FIGS. 7 and 10, the first and second tension interfaces 104, 106 define support notches 108 for receiving the support protuberances 70 disposed on the channel wall 30 of the container 12. The first and second tension interfaces 104, 106 can also include support slots 110 disposed in communication with the support notches 108. The support slots 110 being configured to slidably receive the support proturbances 70 to secure the first and second elongate members 82, 84 and the band assembly 38 to the outer surface 20 of the container 12, within the channel 24.

As further shown in FIGS. 7 and 10, the first and second ends 86, 88 of the first and second elongate members 82, 84 each include first and second coupling tabs 112, 114. The first and second coupling tabs 112, 114 are configured such that when the first and second elongate members 82, 84 are disposed within the channel 24 according to the predetermined orientation, defined by the support and orienting proturbances 70, 72, each of the first coupling tabs 112 are disposed proximate one of the second coupling tabs 114.

In addition, as illustrated in FIGS. 7 and 10, the first tensioning interface 104 also includes a first tensioning member 116 and a first tensioning receptacle 117. The first tensioning member and receptacle 116, 117 cooperatively define a first tab tensioning receptacle 120 that is configured to receive the first and second coupling tabs 112, 114 of the first and second elongated members 82, 84, respectively. When so slidably engaged, the first tensioning member and receptacle 116, 117 and the first and second coupling tabs 112, 114 of the first and second elongated members 82, 84, respectively, define the first support member 44.

As also illustrated in FIGS. 7 and 10, the second tensioning interface 106 includes a second tensioning member 118 and a second tensioning receptacle 119. The second tensioning member and receptacle 118, 119 cooperatively define a second tab tensioning receptacle 122 that is configured to receive the first and second coupling tabs 112, 114 of the second and first elongated members 84, 82, respectively. The second tensioning member and receptacle 118, 119 slidably engage the first and second coupling tabs 112, 114 of the second and first elongated members 84, 82. When so slidably engaged, the second tensioning member and receptacle 118, 119 and the first and second coupling tabs 112, 114 of the second and first elongated members 84, 82 define the second support member 46.

In addition, as shown in FIGS. 7-8 and 10, when the first tensioning member and receptacle 116, 117 and the second tensioning member and receptacle 118, 117 are slidably engaged, the first and second tab tensioning receptacles 120, 122 provide a sufficient tensioning force upon the first and second coupling tabs 112, 114 and the first and second elongated members 82, 84, such that the elongated members 82, 84 are secured to the container 12 within the channel 24.

In alternate embodiments, the coupling tabs 112, 114 may be configured so that the first coupling tabs 112 of the first and second elongated members 82, 84 matingly engage the second coupling tabs 114 of the first and second elongated members 82, 84, thereby providing the requisite tension to the first and second elongated members 82, 84 to secure the band assembly 38 to the outer surface 20 of the container 12. In other alternate embodiments, other forms of mechanical fasteners may be used to exert a tensioning force upon the band assembly 38 to secure it to the outer surface 20 of the container 12 that include, but are not limited to, screw fasteners, hasps, clasps or hooks.

Referring again to the illustrated embodiment, as illustrated in FIGS. 7-13, the mixing bowl 10 may also include a gasket 32 that is configured to be disposed in the channel 24 between the outer surface 20 of the mixing bowl 10 and the band assembly 38. The gasket 32 can be made of a rubberized or otherwise elastic material that can provide a seal between the band assembly 38 and the outer surface 20 of the container 12 to substantially prevent liquid and debris from becoming disposed between the band assembly 38 and the container 12. The gasket 32 can contain top and bottom end walls 34, 36 where the top and bottom end walls 34, 36 are configured to engage the upper and lower circumferential walls 26, 28 of the channel 24, respectively, and also receive the top and bottom edges 94, 96 of the first and second elongate members 82, 84. The gasket 32 can also include an extruded tubular portion 124 that extends from and is integral with the gasket 32. The extruded tubular portion 124 can be configured to abut the channel wall 32 of the channel 24. When the band assembly 38 is disposed in the channel 24 with the gasket 32 disposed between the band assembly 38 and the channel 24, the extruded tubular portion 124 is compressed, thereby creating a seal between the band assembly 38 and the container 12.

As illustrated in FIGS. 9, 10, 12 and 13, the gasket 32 also includes top and bottom flanges 123, 125 that extend outwardly from the top and bottom end walls 34, 36, respectively. The top and bottom sealing flanges 123, 125 each include first and second portions 127, 129. The first portions 127 of the top and bottom flanges 123, 125 are configured to cover at least a portion of the outer surface 20 of the container 12. The second portions 129 of the top and bottom flanges 123, 125 are configured to cover at least a portion of the band assembly 38.

Figure 13:
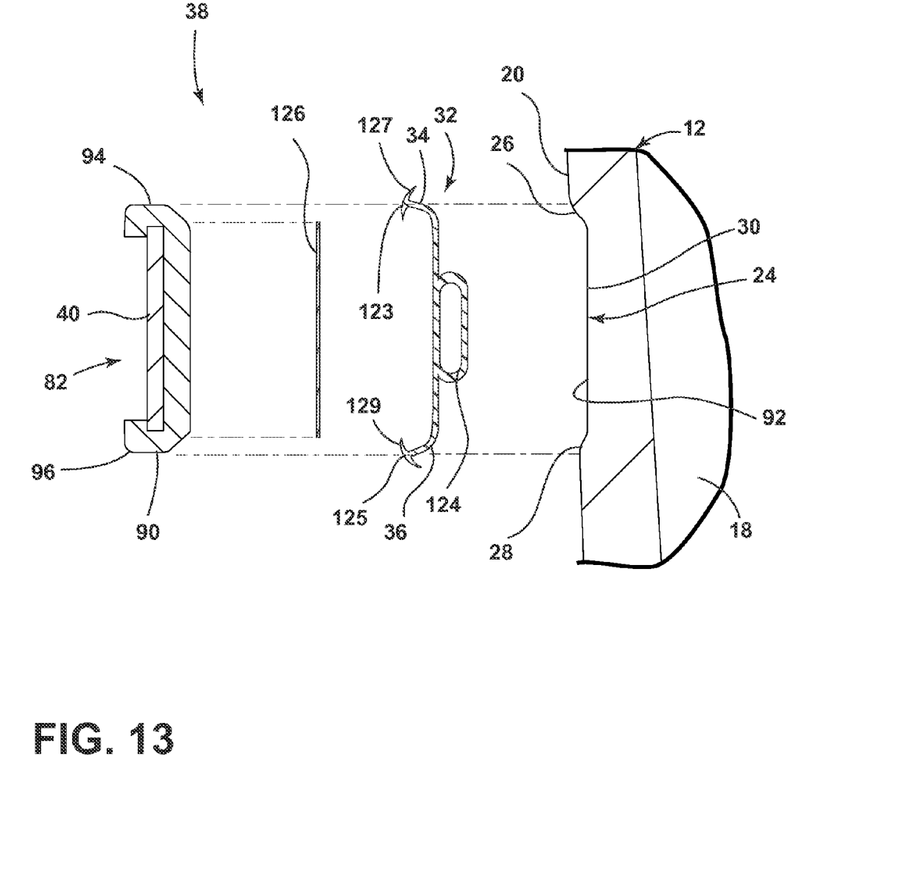
FIG. 13 is an exploded detail section view of FIG. 12.

Also, as shown in FIGS. 7, 10 and 13, a pressure sensitive adhesive 126 may be disposed to the gasket 32 and configured to receive the band assembly 38. In addition, when the band assembly 38 is disposed to the pressure sensitive adhesive 126 on the gasket 32, the gasket 32 is adhered to the band assembly 38, thereby integrating the gasket 32 with the first and second elongate members 82, 84.

The elongate members 82, 84, as illustrated in FIGS. 7-13, can be made of a material configured to receive a tensioning force sufficient to secure the elongate members 82, 84 about the container 12. Such materials can include, but are not limited to, plastics, metals, or a combination thereof.

In alternate embodiments, as illustrates in FIG. 7, the gasket 32 can also include at least one pocket member 128 for receiving the support and orienting proturbances 70, 72, whereby the gasket 32 can provide a continuous seal around the channel 24 and the support and orienting proturbances 70, 72.

In another alternate embodiment, the gasket 32 may contain proturbance openings through which the support and orienting proturbances 70, 72 can extend, to allow the support and orienting proturbances 70, 72 to interface with the elongated members 82, 84.

Referring back to FIGS. 5-10, the mixing bowl 10 also includes first and second support members 44, 46 that are disposed to the band assembly 38 proximate the support proturbance 70. The first and second support members 44, 46 include the first and second tensioning members 116, 118 and receptacles 117, 119.

As shown in FIGS. 7-10, the first and second tensioning receptacles 117, 119 each include an engaging connector 130 that matingly interfaces with an opposing connector 132 disposed on the first and second tensioning members 116, 118. In addition, the first and second tensioning receptacles 117, 119 each define a recess 134 within each of the first and second support members 44, 46 that are configured to be received by a bowl receptacle of a mixer. The first and second support members 44, 46 can thereby selectively rest upon the bowl receptacle and support the mixing bowl 10 for use on the mixer.

In addition, as illustrated in FIG. 10, the first and second tensioning receptacles 117, 119 and the first and second tensioning members 116, 118 can be coupled together, respectively, by first and second connection members 136, 138. The use of selectively removable connectors can allow the bowl assembly to be disassembled for storage, cleaning or replacement of parts, or other purposes.

As illustrated in FIGS. 7-10, the first and second connection members 136, 138 can be screws that connect the first and second tension receptacles 117, 119 to the first and second tensioning members 116, 118, respectively, at the recesses 134. In alternate embodiments, the tension receptacles 117, 119 and the tensioning members 116, 118 can be connected through the use of other mechanical fasteners that can include, but are not limited to, clips, clasps, and the like.

It will be understood by one having ordinary skill in the art that construction of the described application and other components is not limited to any specific material. Other exemplary embodiments of the application disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the application as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present application. The exemplary structures and processes disclosed herein are for illustrative purposes and are not to be construed as limiting.

It is also to be understood that variations and modifications can be made on the aforementioned structures and methods without departing from the concepts of the present application, and further it is to be understood that such concepts are intended to be covered by the following claims unless these claims by their language expressly state otherwise.

The above description is considered that of the illustrated embodiments only. Modifications of the application will occur to those skilled in the art and to those who make or use the application. Therefore, it is understood that the embodiments shown in the drawings and described above is merely for illustrative purposes and not intended to limit the scope of the application, which is defined by the following claims as interpreted according to the principles of patent law, including the Doctrine of Equivalents.

What is claimed is:

1. A bowl assembly for a stand mixer, the bowl assembly comprising:
   an at least partially translucent container that includes a sidewall and a bottom wall, the container including an inner surface, an outer surface, and an open upper edge;
   a channel disposed on the outer surface substantially parallel with the open upper edge, the channel including upper and lower circumferential walls and a channel wall that extends between the upper and lower circumferential walls;
   a gasket that includes top and bottom sealing flanges and that is configured for reception in the channel;
   an extruded tubular portion that extends from and is integral with the gasket, the extruded tubular portion being configured to abut the channel wall;
   a band assembly including at least one elongate band and a tensioning mechanism, wherein the band assembly is configured for reception in the channel; and
   first and second support members that extend substantially orthogonally from the at least one elongate band.

2. The bowl assembly of claim 1, wherein the gasket includes first and second end walls that extend from the gasket and that couple the top and bottom sealing flanges to the gasket.

3. The bowl assembly of claim 2, wherein each of the top and bottom sealing flanges include a first portion that at least partially covers the band assembly and a second portion that at least partially covers the sidewall.

4. The bowl assembly of claim 1, comprising:
   a pressure sensitive adhesive disposed on the gasket, the pressure sensitive adhesive being configured to securely engage the band assembly.

5. The bowl assembly of claim 1, comprising:
   a plurality of engagement protuberances that are spaced about the channel and integrally formed with the container.

6. The bowl assembly of claim 5, comprising:
   a plurality of keyed notches disposed in the band assembly, wherein the plurality of keyed notches are configured to receive the engagement protuberances.

7. The bowl assembly of claim 6, comprising:
   a plurality of retention slots disposed in the band assembly and in communication with the plurality of keyed notches, the plurality of retention slots being configured to slidably receive the plurality of engagement protuberances, thereby securing the band assembly to the container.

8. The bowl assembly of claim 1, comprising:
   a pour spout disposed on the open upper edge of the container and a handle that extends from the sidewall of the container.

9. A bowl assembly for a stand mixer, the bowl assembly comprising:
- a substantially clear container that includes a sidewall and a bottom wall, the container including an inner surface, an outer surface, and an open upper edge;
- a channel disposed on the outer surface substantially parallel with the open upper edge, the channel including upper and lower circumferential walls and a channel wall that extends between the upper and lower circumferential walls;
- at least one engagement protuberance disposed in and integral with the channel;
- a band assembly including at least one elongate band and a tensioning mechanism, wherein the band assembly is configured for reception in the channel, wherein the band assembly includes a gasket that includes top and bottom sealing flanges that are configured for reception in the channel, and an extruded tubular portion that extends from and is integral with the gasket, the extruded tubular portion being configured to abut the channel wall; and
- first and second support members that extend substantially orthogonally from the at least one elongate band.

10. The bowl assembly of claim 9, comprising:
- a plurality of keyed notches disposed in the band assembly, wherein the plurality of keyed notches are configured to receive the engagement protuberances; and
- a plurality of retention slots disposed in the band assembly and in communication with the plurality of keyed notches, the plurality of retention slots being configured to slidably receive the plurality of engagement protuberances, thereby securing the band assembly to the container.

11. The bowl assembly of claim 9, comprising:
- a pour spout disposed on the open upper edge of the container and a handle that extends from the sidewall of the container, wherein the handle includes a first handle end that is connected to the sidewall of the container, and wherein the handle extends from the first handle end away from the open upper edge of the container to a second handle end.

12. The bowl assembly of claim 9, wherein each of the first and second support members includes a receptacle that is configured for reception on the band assembly, and wherein the tensioning mechanism includes the first and second support members.

13. The bowl assembly of claim 12, wherein each at least one elongate band includes coupling members configured to receive the receptacle of at least one of the first and second support members, and wherein the tensioning mechanism includes the coupling members and at least one of the first and second support members.

14. A bowl assembly for a stand mixer, the bowl assembly comprising:
- a substantially clear container that includes a sidewall;
- a channel disposed on an outer surface of the container substantially parallel with an open upper edge;
- at least one engagement protuberance disposed in and integral with the channel;
- a band assembly including at least one elongate band and a tensioning mechanism, wherein the band assembly is configured for reception in the channel;
- a plurality of engagement protuberances that are spaced about the channel and integrally formed with the container, the plurality of engagement protuberances being confined to a recessed area defined by the channel;
- a plurality of keyed notches disposed in the band assembly, wherein the plurality of keyed notches are configured to receive the engagement protuberances; and
- first and second support members that extend substantially orthogonally from the at least one elongate band.

15. The bowl assembly of claim 14, comprising:
- a gasket that includes top and bottom sealing flanges and that is configured for reception in the channel, and wherein the gasket includes first and second end walls that extend from the gasket and that couple the top and bottom sealing flanges to the gasket.

16. The bowl assembly of claim 15, wherein each of the top and bottom sealing flanges include a first portion that at least partially covers the band assembly and a second portion that at least partially covers the sidewall.

17. The bowl assembly of claim 14, wherein each at least one elongate band includes coupling members configured to receive at least one of the first and second support members, and wherein each of the first and second support members includes a receptacle that is configured for reception on at least two coupling members, and wherein the tensioning mechanism includes the coupling members and at least one of the first and second support members.

18. The bowl assembly of claim 14, comprising:
- a pour spout disposed on the open upper edge of the container and a handle that extends from the sidewall of the container.

* * * * *